United States Patent
Zheng et al.

(10) Patent No.: US 7,725,600 B2
(45) Date of Patent: May 25, 2010

(54) METHOD AND APPARATUS PROVIDING ADDRESS MANAGEMENT IN A FLAT STRUCTURE MOBILE NETWORK

(75) Inventors: Haihong Zheng, Coppell, TX (US); Khiem Le, Coppell, TX (US); Rene Purnadi, Coppell, TX (US); Srinivas Sreemanthula, Flower Mound, TX (US)

(73) Assignee: Nokia Corporation, Espoo (FI)

( * ) Notice: Subject to any disclaimer, the term of this patent is extended or adjusted under 35 U.S.C. 154(b) by 1569 days.

(21) Appl. No.: 10/770,881

(22) Filed: Feb. 3, 2004

(65) Prior Publication Data

US 2005/0172014 A1    Aug. 4, 2005

(51) Int. Cl.
*G06F 15/16* (2006.01)
(52) U.S. Cl. .................. 709/245; 709/227; 709/224; 709/240; 370/395.52; 370/392
(58) Field of Classification Search ............. 709/227, 709/224, 240; 370/395.52, 392
See application file for complete search history.

(56) References Cited

U.S. PATENT DOCUMENTS

| | | | | |
|---|---|---|---|---|
| 6,393,482 | B1 * | 5/2002 | Rai et al. .................... | 709/225 |
| 6,407,988 | B1 * | 6/2002 | Agraharam et al. .......... | 370/328 |
| 6,473,413 | B1 | 10/2002 | Chiou et al. ................. | 370/331 |
| 6,473,431 | B1 | 10/2002 | Perlman et al. .............. | 370/400 |
| 6,515,974 | B1 | 2/2003 | Inoue et al. ................. | 370/331 |
| 6,567,664 | B1 | 5/2003 | Bergenwall et al. ....... | 455/435.1 |
| 6,571,289 | B1 * | 5/2003 | Montenegro ................ | 709/227 |
| 6,636,498 | B1 | 10/2003 | Leung ......................... | 370/338 |
| 6,646,999 | B1 | 11/2003 | Kato et al. .................. | 370/329 |
| 6,684,256 | B1 | 1/2004 | Warrier et al. .............. | 709/238 |
| 6,731,621 | B1 * | 5/2004 | Mizutani et al. ............. | 370/338 |
| 6,751,672 | B1 | 6/2004 | Khalil et al. ................. | 709/230 |
| 6,766,168 | B1 * | 7/2004 | Lim .......................... | 455/435.1 |
| 6,862,274 | B1 * | 3/2005 | Tsao et al. ................... | 370/338 |
| 6,907,017 | B2 * | 6/2005 | Reddy et al. ................ | 370/331 |
| 6,930,988 | B2 | 8/2005 | Koodli et al. ............... | 370/331 |

(Continued)

FOREIGN PATENT DOCUMENTS

EP    1 367 780 A1    12/2003

(Continued)

OTHER PUBLICATIONS

Internet Draft, G.Dommety (Editor) A. Yegin, C.Perkins, G.Tsirtsis, K. El-malki, M. Khalil, Title: draft-ietf-mobileip-fast-mipv6-03.txt, Category: Informational Jul. 2001.*

(Continued)

*Primary Examiner*—Thu Nguyen
*Assistant Examiner*—Tauqir Hussain
(74) *Attorney, Agent, or Firm*—Harrington & Smith (57) ABSTRACT

This invention provides an improved address management scheme in a mobile router (MR) that connects a mobile network into the Internet via an access network. The MR performs neighbor advertisement on behalf of mobile network nodes (MNNs) within the mobile network so that packets directed towards the MNNs are routed correctly to the MR, and then to the corresponding MNN, while maintaining standard address management procedures, such as IPv6 address management procedures, in the access network and in the mobile network.

5 Claims, 5 Drawing Sheets

U.S. PATENT DOCUMENTS

| | | | |
|---|---|---|---|
| 6,999,437 B2 | 2/2006 | Krishnamurthi et al. | 370/331 |
| 7,330,449 B2 | 2/2008 | Takahashi et al. | 370/331 |
| 7,339,895 B2 | 3/2008 | Ozaki et al. | 370/252 |
| 7,376,097 B2 | 5/2008 | Yegin | 370/328 |
| 2001/0046223 A1 | 11/2001 | Malki et al. | 370/338 |
| 2002/0126642 A1 | 9/2002 | Shitama | 370/338 |
| 2002/0157024 A1 | 10/2002 | Yokote | 713/201 |
| 2003/0016655 A1 | 1/2003 | Gwon | 370/352 |
| 2003/0018715 A1* | 1/2003 | O'Neill | 709/204 |
| 2003/0087646 A1 | 5/2003 | Funato et al. | 455/456 |
| 2003/0117965 A1* | 6/2003 | Markki et al. | 370/254 |
| 2003/0161287 A1* | 8/2003 | Venkitaraman et al. | 370/338 |
| 2003/0174667 A1 | 9/2003 | Krishnamurthi et al. | 370/328 |
| 2004/0013099 A1 | 1/2004 | O'Neill | 370/338 |
| 2004/0057440 A1 | 3/2004 | Thubert et al. | 370/401 |
| 2004/0111483 A1 | 6/2004 | Watanabe | 709/207 |
| 2004/0218573 A1* | 11/2004 | Takahashi et al. | 370/338 |
| 2004/0246931 A1* | 12/2004 | Thubert et al. | 370/338 |
| 2005/0169220 A1 | 8/2005 | Sreemanthula et al. | 370/338 |

FOREIGN PATENT DOCUMENTS

| | | |
|---|---|---|
| EP | 1 376 973 A1 | 1/2004 |
| EP | 1 473 901 A2 | 11/2004 |

OTHER PUBLICATIONS

Perkins, Charle E., and Johnson, David B., "Mobility Support in IPv6", 1996, MOBICOM, 1996 ACM 0-89791-872-X/96/11, pp. 27-37.

Narten et al., "Neighbor Discovery for IP version 6 (IPv6)", 1998, Network working Group, pp. 1-79.

Ernst et al., "Network Mobility Support Terminology", 2002, IETF Internet Draft, pp. 1-18.

Lee, K., et al., "Route Optimization for Mobile Nodes in Mobile Network Based on Prefix Delegation", Vehicular Technology Conference, 2003-Fall, IEEE, pp. 2035-2038.

Devarapalli, et al., "Network Mobility (NEMO) Basic Support Protocol", Dec. 2003, pp. 1-29.

* cited by examiner

METHOD AND APPARATUS PROVIDING ADDRESS MANAGEMENT IN A FLAT STRUCTURE MOBILE NETWORK

TECHNICAL FIELD

This invention relates generally to mobile data communication networks, and more specifically relates to flat structure mobile networks compatible with IPv6 and equivalent protocols.

BACKGROUND

The following abbreviations will be referenced in the ensuing description.

| | |
|---|---|
| AP | Access Point |
| AR | Access Router |
| BU | Binding Update |
| CoA | Care-of Address |
| HA | Home Agent |
| HA_MR | Home Agent Mobile Router |
| LLA | Link Layer Address |
| MAC | Media Access Control |
| MNN | Mobile Network Node |
| MONET | MObile NETwork |
| MR | Mobile Router |
| PAN | Personal Area Network |
| PSBU | Prefix Scope Binding Update |

In general, network mobility support deals with managing the mobility of an entire network, viewed as a single unit, which is capable of changing its point of attachment to the Internet and thus its reachability in the Internet topology. This type of network can be referred to as a MONET, and includes at least one MR connected to the global Internet. Those nodes behind the MR, referred to as MNNs, may be fixed or mobile.

A MONET can take several different forms, examples of which include the following.

Networks attached to a PAN: A mobile phone having a cellular interface and a local interface, such as a Bluetooth™ interface, together with a Bluetooth-enabled PDA constitute a very simple instance of a mobile network. In this case the mobile phone functions as the MR that is attached to the Internet via cellular links, while the PDA functions as a MNN that is used for web browsing or running a personal web server.

Access networks deployed in public transportation: A public transportation vehicle provides Internet access to IP devices carried by passengers. The access points in the vehicle function as MRs, while the passenger's personal communication devices are MNNs.

Figure 1:
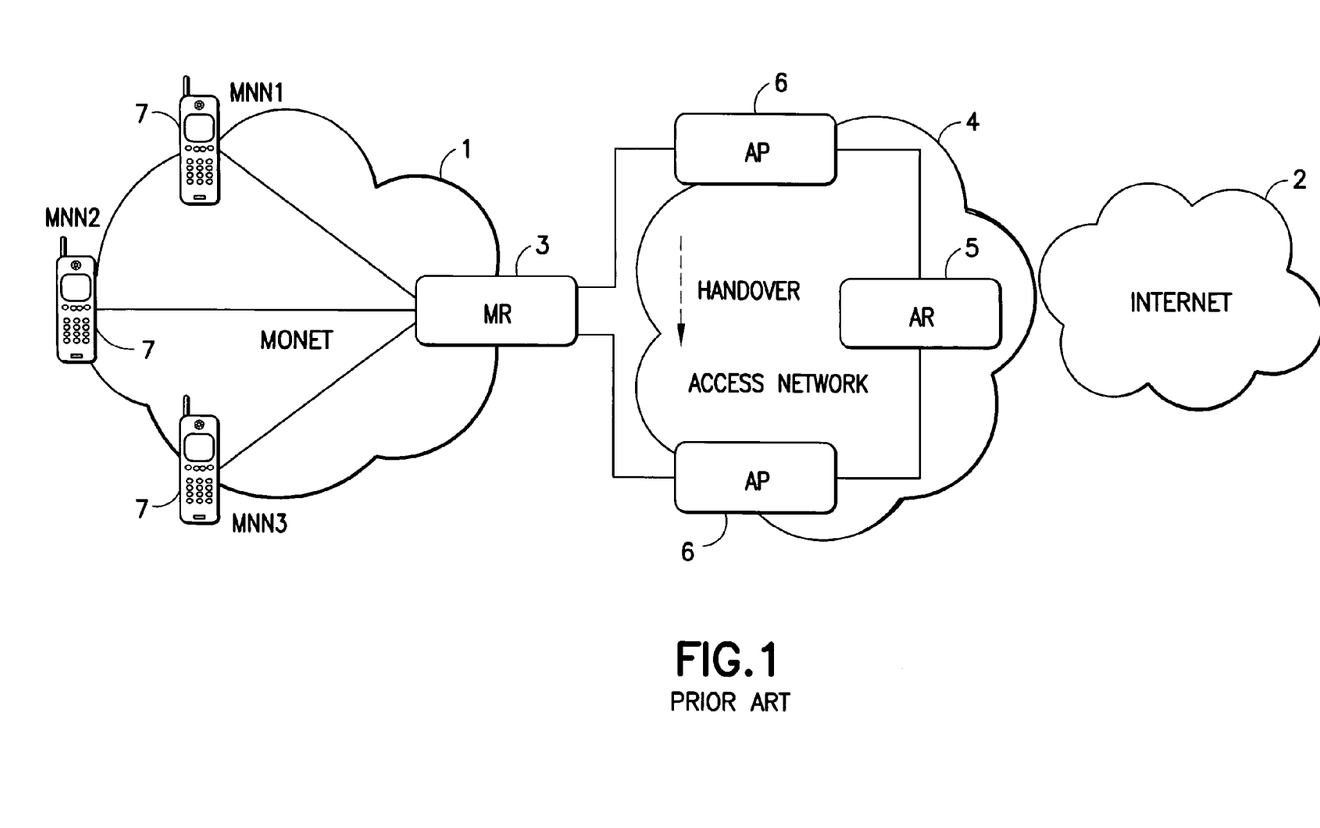
FIG. 1 illustrates a conventional MONET and its connection to the Internet.

FIG. 1 shows an example of a conventional MONET 1 and its connection to the Internet 2. The MR 3 of the MONET 1 connects to the Internet 2 via an access network 4. An AR 5 in the access network 4 is a first-hop router that connects the MR 3 to the Internet 2. At least one link technology-specific AP 6 may exist between the MR 3 and the AR 5 to provide link layer connectivity between the MR 3 and the AR 5. The MR 3 may move between APs 6 and/or ARs 5, and thus a handover mechanism is provided. A plurality of MNNs 7 (shown for convenience as three MNNs, two being mobile and one being fixed) connect to the access network 4 via the MR 3. The link technology used in the MONET 1 may or may not be the same as the link technology used between MR 3 and the AP 6. Each MNN 7 and the MR 3 may configure its own EUI-64 Link Layer Address (LLA) based on the link technology in use.

Two types of approaches can be employed to provide mobility control and address management to the MNNs 7.

A first type of approach is a NEMO technique. NEMO support requires that none of the nodes behind the MR 3 be aware of the MONET mobility. In another words, the change of attachment of the MONET 1 should be completely transparent to the MNNs 7 behind the MR 3. The NEMO technique is described in greater detail below with regard to FIG. 2.

Figure 2:
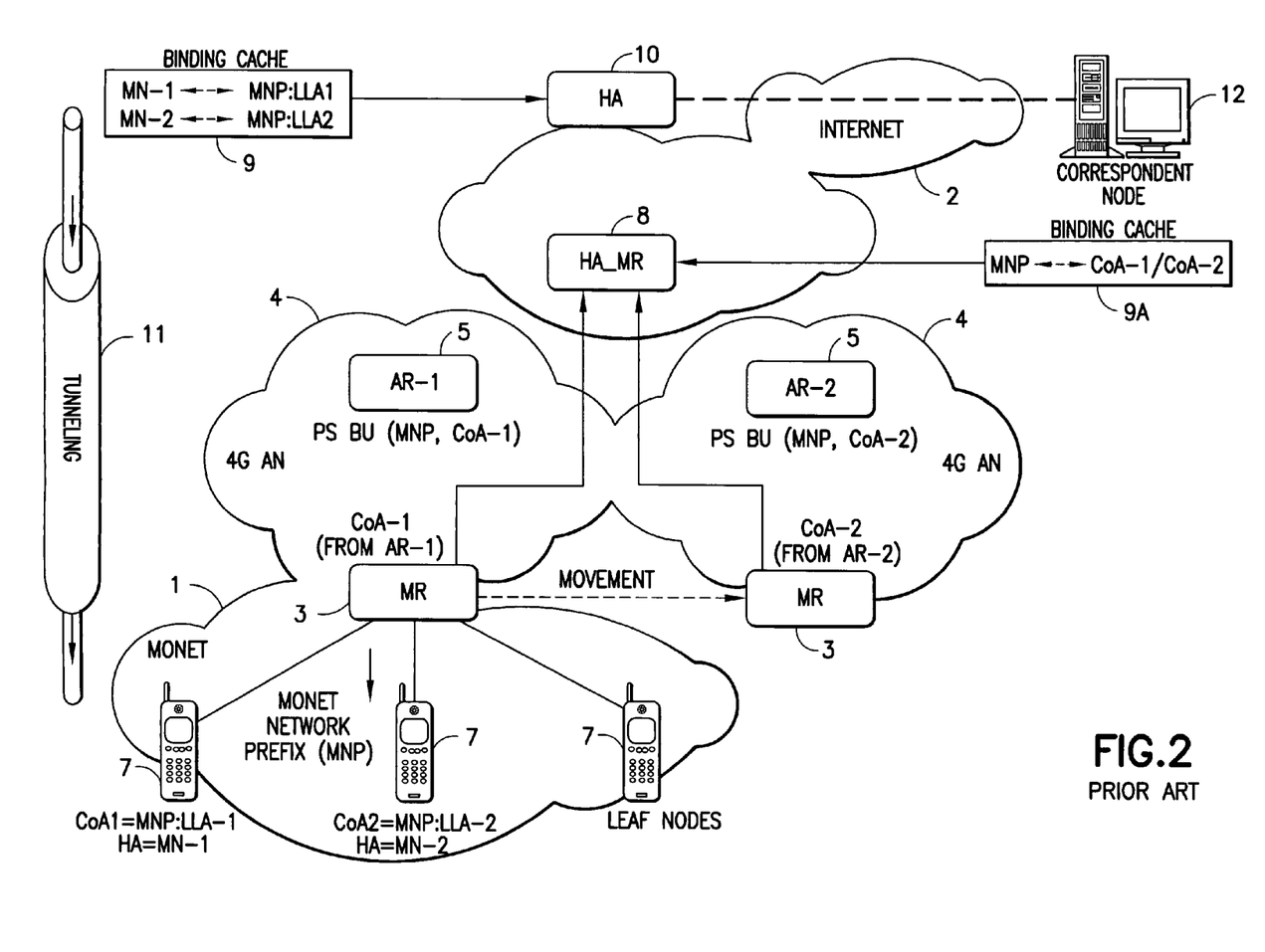
FIG. 2 shows a conventional NEMO-based mobile network mobility system.

The basic NEMO approach is illustrated in FIG. 2. The MR 3 is assumed to have an assigned home network with a home agent referred to as the HA_MR 8. Each MONET 1 where a MR 3 resides is assigned a MONET network prefix (MNP), which is the permanent network prefix assigned in the home link of the MR 3. The MNP is not changed when the MR 3 moves its network attachment from one AR 5 to another. The ingress interface of the MR 3 is configured with the MNP, and the CoAs of all the MNNs 7 in the MONET 1 are configured using the MNP. As long as the MNN 7 resides within the same MONET 1, its CoA need not be changed. The MNN 7 may update a binding cache 9 in its own HA 10 and correspondent nodes 12 by sending a BU. With this configuration, all of the packets sent to the CoA of the MNN 7 are first routed to the home link of the MR 3, and intercepted by the HA_MR 8, which further routes the packet to the MR 3 as described below.

The MR 3 configures its CoA using the network prefix advertised by the serving AR 5 (AR-1) on its egress interface. When the MR 3 changes its attachment point, it reconfigures its CoA using the prefix of the new AR 5 (AR-2). In addition to sending a BU with the new CoA to the HA_MR 8 to update the binding cache 9A, the MR 3 also sends a Prefix Scope Binding Update (PS BU) message to the HA_MR 8. The PS BU is an enhanced BU that associates the CoA of the MR 3 to the MNP instead of to a single address. The HA_MR 8 uses this binding to tunnel (shown generally as tunnel 11) to the MR 3 any packet that shows the MNP in the destination field, although some other scheme (e.g., router optimization) may be used to avoid or reduce the overhead due to the tunneling between the HA_MR 8 and the MR 3. After decapsulating the tunneled packet from the HA_MR 8, the MR 3 forwards the original packet to the correspondent MNN 7 within the MONET 1.

With this approach, even when the MR 3 moves between ARs 5, and thus changes its CoA, the MNNs 7 within the MONET 1 are enabled to use the same CoA, and no new CoAs are needed for MNNs. This reduces the overhead due to IP mobility of each MNN 7. However, the overhead due to the bi-directional tunneling between the HA_MR 8 and the MR 3 is posted over the interface between the MR 3 and the AR 5, and is applied to all packets inbound to or outbound from the MNNs 7. Since the access interface between the MR 3 and the access network 4 is most likely a radio interface in the cases of particular interest to this invention, the overhead incurred by the use of the tunneling 11 significantly reduces the spectrum efficiency of the wireless link.

A second approach is a flat structure technique, where instead of providing grouped IP mobility as in the NEMO approach each MNN 7 is responsible for handling its own IP mobility. Each MNN 7 configures its associated CoA using the prefix of the serving AR 5. Whenever MR 3 attaches to a new AR 5, each MNN 7 reconfigures its CoA and sends a BU to its HA 10 and correspondent nodes. Packets flowing towards a MNN 7 are routed based on the CoA of the MNN 7 and, thus, no tunneling protocol is required between the HA_MR 8 and the MR 3 as in the NEMO approach.

Each of these two approaches may be used in different applications, and in some cases may coexist.

Although optimized for grouped mobility, the NEMO-based approach introduces a high overhead over the access interface, and a corresponding low routing efficiency, due to the tunneling 11 that occurs between the HA_MR 8 and the MR 3. The presence of the HA_MR 8 also requires infrastructure support from the service provider. The NEMO-based solution is thus more applicable to the task of providing access in a high mobility environment, such as a high speed mass transportation environment involving, for example, a train or a bus.

When compared to the NEMO approach, the flat structure approach has the advantage that it does not require the support of the HA_MR 8, and thus provides enhanced system simplicity for the service provider. It also eliminates the tunneling 11 between the MR 3 and the HA_MR 8, as well as the triangle routing introduced by the presence of HA_MR 8, and thus leads to an improved spectrum efficiency and reduced transport delay and overhead. The flat structure based solution is more applicable in a hot spot application such as is found in a small area such as an office, home, café or airport, with no or low mobility.

In the flat structure-based mobility management approach each MNN 7 sends its neighbor advertisement to the AR 5 via the MR 3. The neighbor advertisement contains the mapping between the CoA of the MNN 7 and its LLA, which is recorded in a neighbor cache of the AR 5. When the AR 5 receives a downlink packet directed toward the MNN 7, it uses the LLA recorded in the neighbor cache to transmit the layer 2 (L2) frame to the MNN 7. However, since the link technology used in the access network 4 and in the MONET 1 could be completely different, the access network 4 and the MONET 1 may have a completely different LLA management scheme. For example, the self-constructed EU-64-bit format of LLA used in Ethernet and other access technologies, may not be applicable to an access network 4 that employs cellular technology having a centralized control mechanism of LLA assignment. As a result, the LLA for each MNN 7 may not be recognized by the nodes in the access network 4, and the L2 frame sent from the AR 5 using the LLA of the MNN 7 may not reach the MONET 1.

It can thus be appreciated that in the flat structure approach to mobility control and address management discussed above, in order for the AR 5 to route the downlink packet to the MNN 7 through the corresponding MR 3, some special address management and mobility control schemes are required. However, prior to this invention a suitable-address management and mobility control scheme was not available.

SUMMARY OF THE PREFERRED EMBODIMENTS

The foregoing and other problems are overcome, and other advantages are realized, in accordance with the presently preferred embodiments of these teachings.

This invention provides an improved address management scheme in a mobile router that connects a mobile network into the Internet via an access network. In accordance with this invention the MR performs neighbor advertisement on behalf of MNNs within the mobile network so that packets directed towards the MNNs are routed correctly to the MR, and then to the corresponding MNN, while maintaining standard management procedures, such as IPv6 address management procedures, in the access network and in the mobile network.

In a first embodiment of this invention a method and system operate to manage addresses in a network so that, when connecting a MR of a MONET to an AP of an access network that includes an AR, the method sends a first neighbor advertisement from a MNN, the first neighbor advertisement comprising a CoA and a LLA of the MNN within the MONET. Based on the first neighbor advertisement, the method constructs a first neighbor cache in the MR that associates the CoA with the LLA and sends a second neighbor advertisement from the MR to the access network on behalf of the MNN, the second neighbor advertisement comprising a mapping between the CoA of the MNN and a LLA of the MR (LLA_MR). The method further operates, based on the second neighbor advertisement, to construct a second neighbor cache in the AR that associates the CoA with the LLA_MR.

In response to an arrival of a downlink packet at the AR having a CoA in a destination address field, the method checks the second neighbor cache using the CoA to obtain the associated LLA_MR of the MR and transmits the packet to the MR using the LLA_MR in a link layer destination address field. In response to the arrival of the packet at the MR, the method checks the first neighbor cache using the CoA in an IP layer destination address field to obtain the associated LLA of the MNN and transmits the packet to the MNN using the obtained LLA in the link layer destination address field.

In a second embodiment, and based on the first neighbor advertisement, the method operates to construct the first neighbor cache in the MR that associates the CoA with the LLA, and to construct a mapping table that associates the CoA with one of the set of LLAs of the MR (LLA_MRi). The method also sends a second neighbor advertisement from the MR to the AN on behalf of the MNN, the second neighbor advertisement comprising a mapping between the CoA of the MNN and the LLA_MRi and, based on the second neighbor advertisement, the method constructs a second neighbor cache in the AR that associates the CoA with the LLA_MRi.

In the second embodiment, and in response to an arrival of a downlink packet at the AR having a CoA in a destination address field, the method checks the second neighbor cache using the CoA to obtain the associated LLA_MRi of the MR and transmits the packet to the MR using the LLA_MRi in the link layer destination address field. In response to the arrival of the packet at the MR, the method checks the first neighbor cache using the CoA obtained from the IP destination address field to obtain the associated LLA of the MNN and transmits the packet to the MNN using the obtained LLA in the link layer destination address field.

In a third embodiment, and based on the first neighbor advertisement, the method constructs a mapping table in the MR that associates the LLA of the MNN with one of the set of LLAs of the MR (LLA_MRi), and sends the second neighbor advertisement from the MR to the AN on behalf of the MNN, the second neighbor advertisement comprising a mapping between the CoA of the MNN and the LLA_MRi. Based on the second neighbor advertisement, the method constructs a neighbor cache in the AR that associates the CoA with the LLA_MRi.

In the third embodiment, and in response to an arrival of a downlink packet at the AR having a CoA in a destination address field, the method checks, as in the second embodiment, the neighbor cache using the CoA to obtain the associated LLA_MRi of the MR, and transmits the packet to the MR using the LLA_MRi in the link layer destination address field. In response to the arrival of the packet at the MR, in this embodiment the method checks the mapping table using the LLA_MRi in the link layer destination address field to obtain the associated LLA of the MNN and transmits the packet to the MNN using the obtained LLA in the link layer destination address field.

In preferred embodiments of this invention the MR may be a wireless device, such as a cellular device. As such, the MR may be embodied in a cellular telephone.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

It is shown below that the use of this invention enables the AR 5 to correctly route a downlink packet to a MNN 7 through the correspondent MR 3 by providing an address management technique for the access network 4 and the MR 3. Note that the MR 3 may be referred to herein simply as a gateway mobile terminal.

This invention is described in the context of the Internet Protocol Version 6 (IPv6), also referred to as the Next Generation Internet Protocol or IPng. IPv6 was recommended by the IPng Area Directors of the Internet Engineering Task Force at a Toronto IETF meeting on Jul. 25, 1994 in RFC 1752, "The Recommendation for the IP Next Generation Protocol". The recommendation was approved by the Internet Engineering Steering Group and made a Proposed Standard on Nov. 17, 1994. The core set of IPv6 protocols were made an IETF Draft Standard on Aug. 10, 1998. Internet Protocol Version 6 is abbreviated to IPv6 (where the "6" refers to it being assigned version number 6). The previous version of the Internet Protocol is version 4 (referred to as IPv4).

Figure 3:
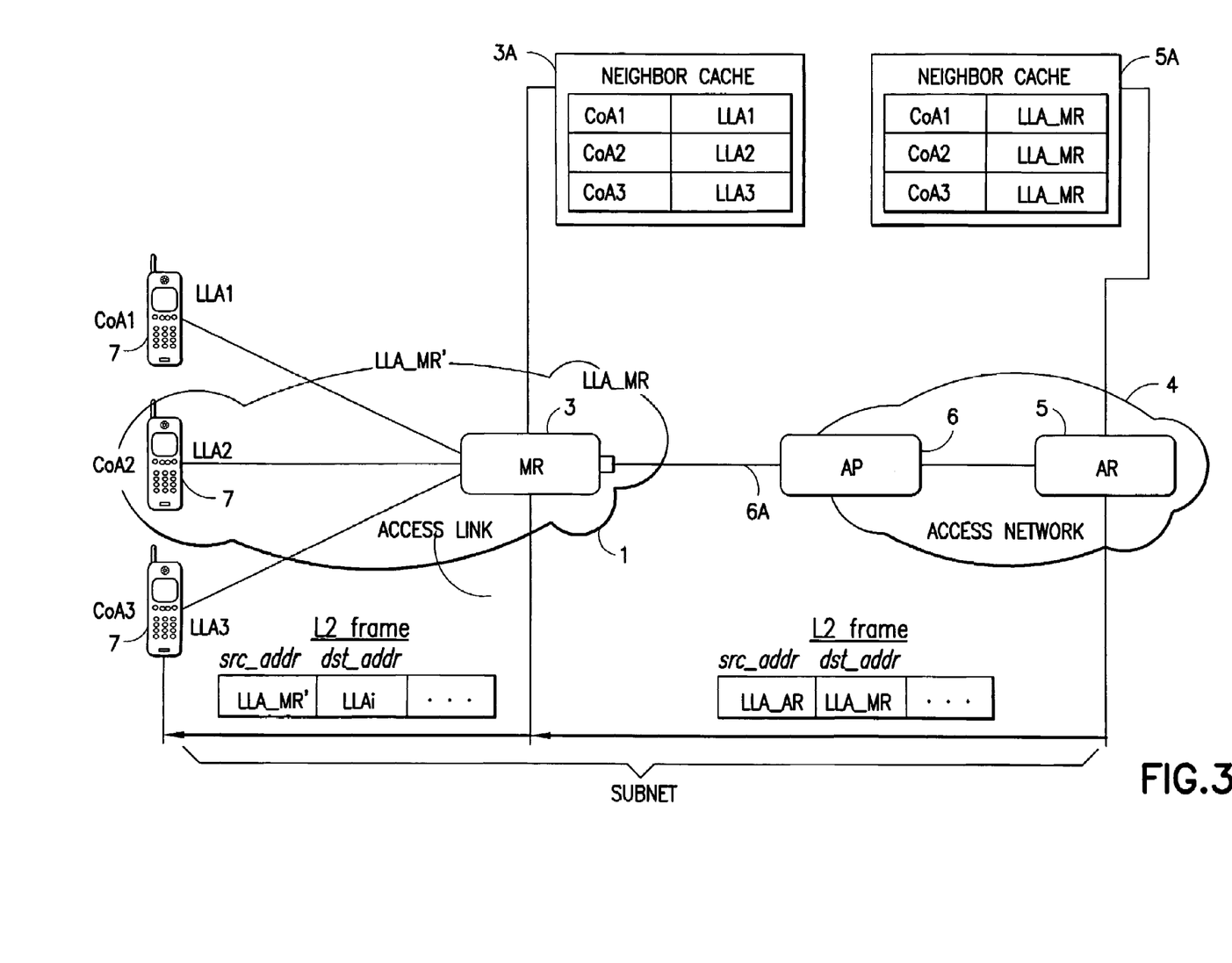
FIG. 3 shows an embodiment of address management in a flat structure with a single MR LLA.

FIG. 3 shows the case of address management in a flat structure, with a single MR LLA. A subnet may be implied to exist between the MNNs 7 and the AR 5. In FIG. 3 the MR 3 and each MNN 7 configures its own LLA. In this embodiment the MR 3 has two types of LLA, where one is used within the MONET 1 and is based on the link technology used in the MONET 1, referred to herein as LLA_MR', and the other is used over the access interface 6A to the access network 4 via the AP 6, based on the access link technology in use, and is referred to herein as LLA_MR. The LLA for each MNNi is referred to as LLAi.

After receiving the router advertisement sent from the AR 4, which carries the network prefix of the AR 4, the MR 3 may forward the router advertisement to the MONET 1, or if more appropriate for the MONET 1 link technology, it may generate a new router advertisement message that contains the network prefix of the AR 4. The MR 3 and each MNN 7 configures its CoA using the network prefix of the AR 5.

Each MNN 7 sends a neighbor advertisement with its CoA and LLA within the MONET 1. These neighbor advertisements are used to construct a neighbor cache 3A in the MR 3. The MR 3 does not, however, forward the neighbor advertisements from the MNNs 7 to the access network 4. Instead, the MR 3 sends a neighbor advertisement to the access network 4 on behalf of the MNNs 7. The neighbor advertisement in this case contains the mapping between the CoA of each MNN 7 and the LLA_MR, which are recorded in the neighbor cache 5A of the AR 5.

When a downlink packet (one directed towards a MNN 7) reaches the AR 5, the AR 5 checks its neighbor cache 5A and obtains the LLA of the MR 3 by using the CoA of the MNN 7 that is carried in the IP layer destination address field of the downlink packet. That is, the AR 5 indexes into the neighbor cache 5A using the CoA to look-up the corresponding LLA_MR of the MR 3 associated with the MONET 1 that contains the MNN 7. The AR 5 then transmits the downlink packet(s) in the L2 frame to the correspondent MR 3 using the LLA_MR. After receiving the L2 frame from the AR 5, the MR 3 checks its neighbor cache 3A and obtains the LLA of the correspondent MNN 7, based on the CoA carried in the IP layer destination address of the arriving packet(s), then transmits the packet(s) to the MNN 7 using LLA of the MNN 7.

As can be appreciated, this embodiment uses multi-home support in the MR 3, i.e., multiple IP addresses that are mapped to a single LLA.

Figure 4:
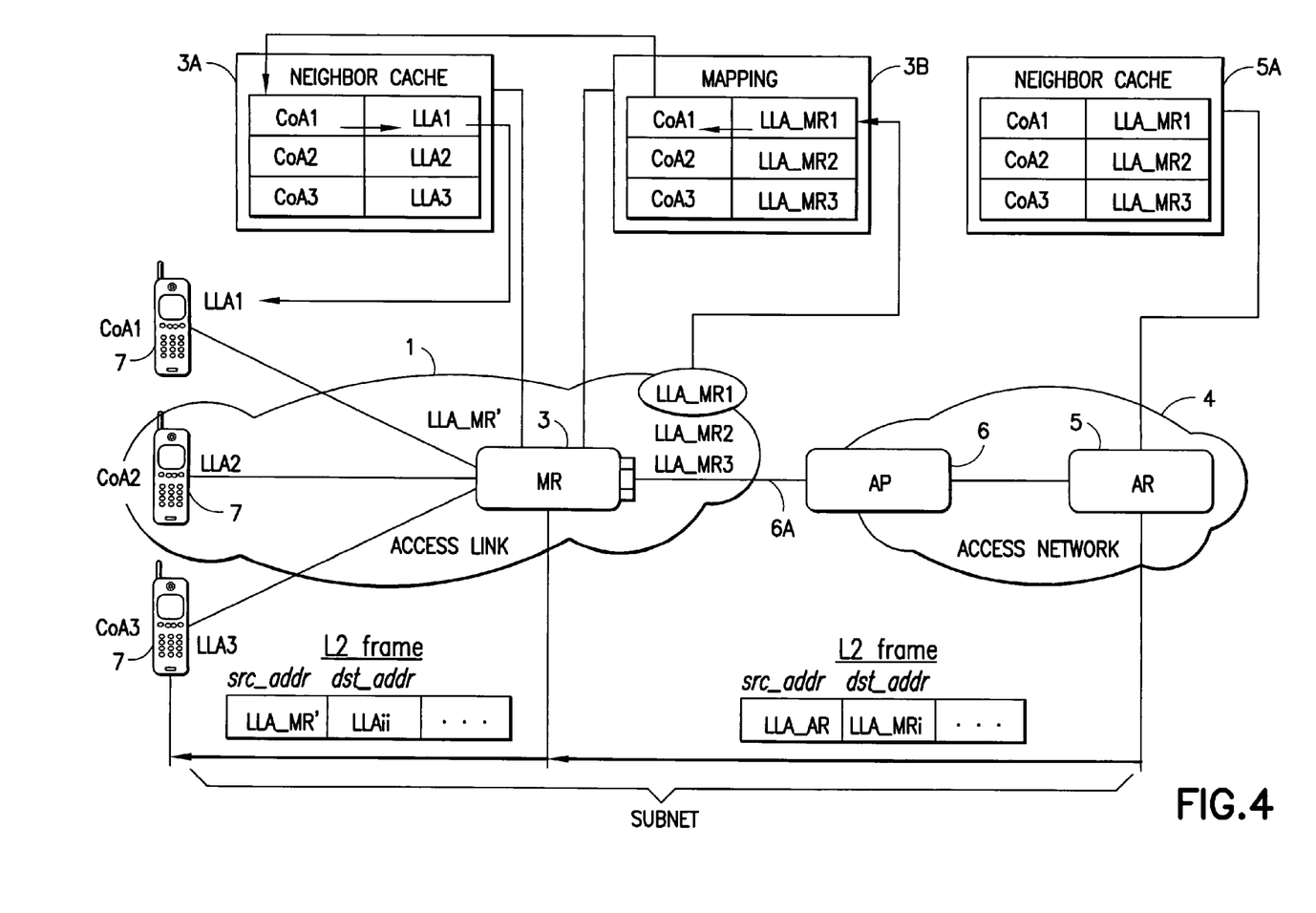
FIG. 4 depicts a first embodiment of address management in a flat structure with multiple MR LLAs.

FIG. 4 shows the case of address management in a flat structure, with multiple MR LLAs. In the embodiment of FIG. 4 the MR 3 is assigned a set of LLAs ({LLA_MRi}), shown in this non-limiting example as LLA_MR1, LLA_MR2 and LLA_MR3 and stored in a mapping table 3B. Each MNN 7 sends a neighbor advertisement with its CoA and LLA within the MONET 1. These neighbor advertisements are used to construct a neighbor cache 3A in the MR 3. The MR 3 does not, however, forward the neighbor advertisements from the MNNs 7 to the access network 4. Instead, the MR 3 maps the CoA of each MNN 7 to a unique LLA (MNNi is mapped to LLA_MRi) from the set of MR LLAs. The MR 3 sends a neighbor advertisement to the access network 4 on behalf of the MNNs 7. The neighbor advertisement contains, for each of the MNNs 7, the mapping between the CoA of the MNN 7 and the associated LLA_MRi. The neighbor advertisement information is recorded in the neighbor cache 5A of the AR 5.

When a downlink packet reaches the AR 5, the AR 5 checks its neighbor cache 5A and obtains the LLA_MRi address of the MR 3 by using the CoA of the MNN 7 that is carried in the IP layer destination address field of the downlink packet. The AR 5 then transmits the downlink packet(s) in the L2 frame to the correspondent MR 3 using the LLA_MRi. As is generally shown in FIG. 4 by the various Arrows for the case of a packet directed to the MNN 7 associated with CoA1/LLA1, after receiving the L2 frame from the AR 5 the MR 3 first indexes into the mapping table 3B using the received LLA_MRi and obtains the corresponding CoA. An alternative way to obtain the CoA is to obtain it from the IP layer destination address field in the received downlink packet. The corresponding CoA is then used to index the neighbor cache 3A to obtain the corresponding LLAi of the MNN 7, and the packet is sent to the MNN 7 with the LLA in the link layer destination field.

Figure 5:
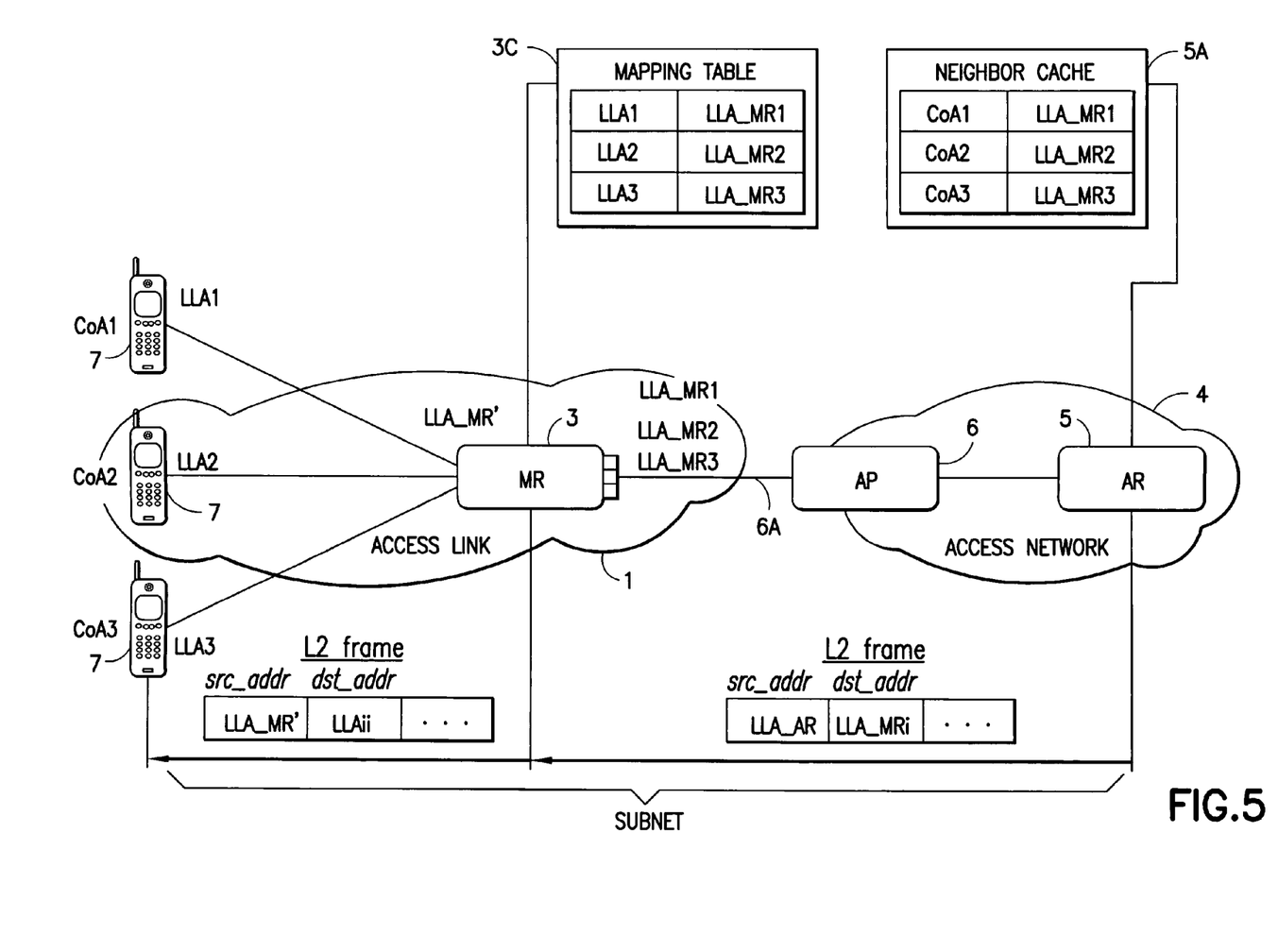
FIG. 5 depicts a second embodiment of address management in a flat structure with multiple MR LLAs.

FIG. 5 shows a further embodiment based on the embodiment of FIG. 4, where the neighbor cache 3A and the mapping table 3B are replaced by a mapping table 3C for directly looking-up the LLAi of a MNNi based on a received LLA_MRi. This embodiment implies that although the MR3 advertises the CoA of a MNN 7, in conjunction with the corresponding LLA_MRi as was described above for the embodiment of FIG. 4, it does not need to store or record the CoA in the mapping table 3C.

The embodiments of FIGS. 4 and 5 imply the support of multiple LLAs for the MR 3. One suitable technique for providing multiple LLAs for the MR 3 is described in U.S.

patent application Ser. No. 10/770,880, filed on even date with this patent application, and entitled "Method and Apparatus to Provide Group Management of Multiple Link Identifiers for Collective Mobility", also by Srinivas Sreemanthula, Haihong Zheng, Rene Purnadi and Khiem Le, the disclosure of which is incorporated by reference herein in its entirety.

The advantages made possible by the use of the embodiments of the invention shown in FIGS. 3, 4 and 5, as compared with the NEMO approach discussed above in relation to FIG. 2, include the following. First, no tunneling is required between the HA_MR 8 and the MR 3, resulting in improved spectrum efficiency. Second, the absence of triangle routing introduced by the HA_MR 8 results in an improved transport delay. Third, the MNNs 7 can support standard protocols, such as IPv6/MIPv6, and additional standardization efforts are not required for the MNNs. In addition, network infrastructure support, such as that required to provide the HA_MR 8, is not required, thereby providing a reduction in system complexity for the service provider.

It is noted that since the embodiments of the invention are based on the flat structure architecture, an optimization of grouped mobility is not a goal, as in the NEMO architecture. Thus, a new CoA is preferably configured in each MNN 7, and a BU is preferably sent from each MNN 7, when the MR 3 changes its network attachment by connecting to a new AP 6. However, since the flat structure-based approach is more suitable for use in a low or no mobility network, the change of CoA and the associated sending of the BU would not typically occur frequently enough to have a significant impact on network efficiency and bandwidth utilization.

As should be realized, the various embodiments of this invention each include a system that includes data processors that operate in accordance with stored programs for carrying out the invention. For example, each of the MR 3, such as a wireless device embodiment that includes cellular capability, and that may function also as a cellular telephone, the MNNs 7 and the AR 5 will each include some type of local intelligence embodied in a programmed data processor that operates in accordance with the foregoing procedures to implement the improved flat structure network mobility procedures.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. For example, while this invention has been described generally in the context of IPv6 procedures, and includes the use of the neighbor cache and neighbor discovery, at least some aspects of this invention can be applied to other networking procedures having equivalent or different address management mechanisms. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method to manage addresses in a network, comprising:
when connecting a mobile router (MR) of a mobile network (MONET) to an access point (AP) of an access network (AN) that includes an Access Router (AR), sending a first neighbor advertisement from a mobile network node (MNN) to the MR, the first neighbor advertisement comprising a care of address (CoA) and a link layer address (LLA) of the MNN within the MONET;
based on the first neighbor advertisement, constructing a first neighbor cache in the MR that associates the CoA with the LLA;
sending a second neighbor advertisement from the MR to the AN on behalf of the MNN, the second neighbor advertisement comprising a mapping between the CoA of the MNN and a LLA of the MR (LLA_MR);
based on the second neighbor advertisement, constructing a second neighbor cache in the AR that associates the CoA with the LLA_MR;
in response to an arrival at the AR of a downlink packet having a CoA in an IP layer destination address field, checking, by the AR, the second neighbor cache using the CoA to obtain the associated LLA_MR of the MR;
transmitting the packet from the AR to the MR using the LLA_MR in a link layer destination address field;
in response to the arrival at the MR of the packet, checking, by the MR, the first neighbor cache using the CoA in the IP layer destination address field to obtain the associated LLA of the MNN; and
transmitting the packet from the MR to the MNN using the obtained LLA in the link layer destination address field.

2. A method as in claim 1, where the LLA_MR comprises one LLA of a set of LLAs of the MR (LLA_MRi).

3. A method to manage addresses in a network, comprising:
when connecting a mobile router (MR) of a mobile network (MONET) to an access point (AP) of an access network (AN) that includes an Access Router (AR), sending a first neighbor advertisement from a mobile network node (MNN) to the MR, the first neighbor advertisement comprising a care of address (CoA) and a link layer address (LLA) of the MNN within the MONET;
based on the first neighbor advertisement, constructing a mapping table in the MR that associates the LLA of the MNN with one of a set of LLAs of the MR (LLA_MRi);
sending a second neighbor advertisement from the MR to the AN on behalf of the MNN, the second neighbor advertisement comprising a mapping between the CoA of the MNN and the LLA_MRi;
based on the second neighbor advertisement, constructing a neighbor cache in the AR that associates the CoA with the LLA_MRi;
in response to an arrival at the AR of a downlink packet having a CoA in an IP layer destination address field, checking, by the AR, the neighbor cache using the CoA to obtain the associated LLA_MRi of the MR;
transmitting the packet from the AR to the MR using the LLA_MRi in a link layer destination address field;
in response to the arrival at the MR of the packet, checking, by the MR, the mapping table using the LLA_MRi in the link layer destination address field to obtain the associated LLA of the MNN; and
transmitting the packet from the MR to the MNN using the obtained LLA in the link layer destination address field.

4. A system to manage addresses in a network, comprising a mobile network (MONET) having a mobile router (MR) and at least one Mobile Network Node (MNN), said Monet being connectable via the MR to an access point (AP) of an access network (AN) that comprises an Access Router (AR), where a data processor of the MNN is responsive to the MR connecting to the AP to send to the MR a first neighbor advertisement that comprises a care of address (CoA) and a link layer address (LLA) of the MNN within the MONET; where a data processor of the MR, responsive to the first neighbor advertisement, constructs a first neighbor cache that associates the CoA with the LLA and sends a second neighbor advertisement from the MR to the AN on behalf of the MNN, the second neighbor advertisement comprising a mapping between the CoA of the MNN and a LLA of the MR (LLA_MR); and where a data processor of the AR, responsive to the second neighbor advertisement, constructs a second neighbor cache that associates the CoA with the LLA_MR, where said AR data processor is further responsive to an arrival at the AR of a downlink packet having a CoA in an IP layer destination address field to check the second neighbor cache using the CoA to obtain the associated LLA_MR of the MR and to transmit the packet from the AR to the MR using the LLA_MR in a link layer destination address field; where said MR data processor is further responsive to the arrival of the packet at the MR to check the first neighbor cache using the CoA in the IP layer destination address field to obtain the associated LLA of the MNN to transmit the packet from the MR to the MNN using the obtained LLA in the link layer destination address field.

5. A system as in claim 4, where the LLA_MR comprises one of a set of LLAs of the MR (LLA_MRi).

* * * * *